United States Patent [19]
Yuasa

[11] 4,402,611
[45] Sep. 6, 1983

[54] COLORIMETER

[75] Inventor: Yoshio Yuasa, Kawachinagano, Japan

[73] Assignee: Minolta Camera Kabushiki Kaisha, Osaka, Japan

[21] Appl. No.: 160,916

[22] Filed: Jun. 19, 1980

[30] Foreign Application Priority Data

Aug. 4, 1979 [JP] Japan ................................. 54-99608

[51] Int. Cl.³ .............................................. G01J 3/50
[52] U.S. Cl. .................................... 356/405; 364/526
[58] Field of Search ............... 356/405, 406, 402, 407; 364/526; 250/226

[56] References Cited
FOREIGN PATENT DOCUMENTS
52-38982 3/1977 Japan ................................. 356/405

OTHER PUBLICATIONS
Tominaga et al., Acta Chromatic, vol. 3, No. 3, 1978, pp. 103–110.

Primary Examiner—F. L. Evans
Attorney, Agent, or Firm—Wenderoth, Lind & Ponack

[57] ABSTRACT

A trichromatic colorimeter for obtaining the CIE chromaticity coordinates for an object to be measured. By utilizing a logarithmic compression type light measuring circuit, a higher accuracy and measuring range are obtainable in comparison to prior art linear light measuring type colorimeters.

13 Claims, 3 Drawing Figures

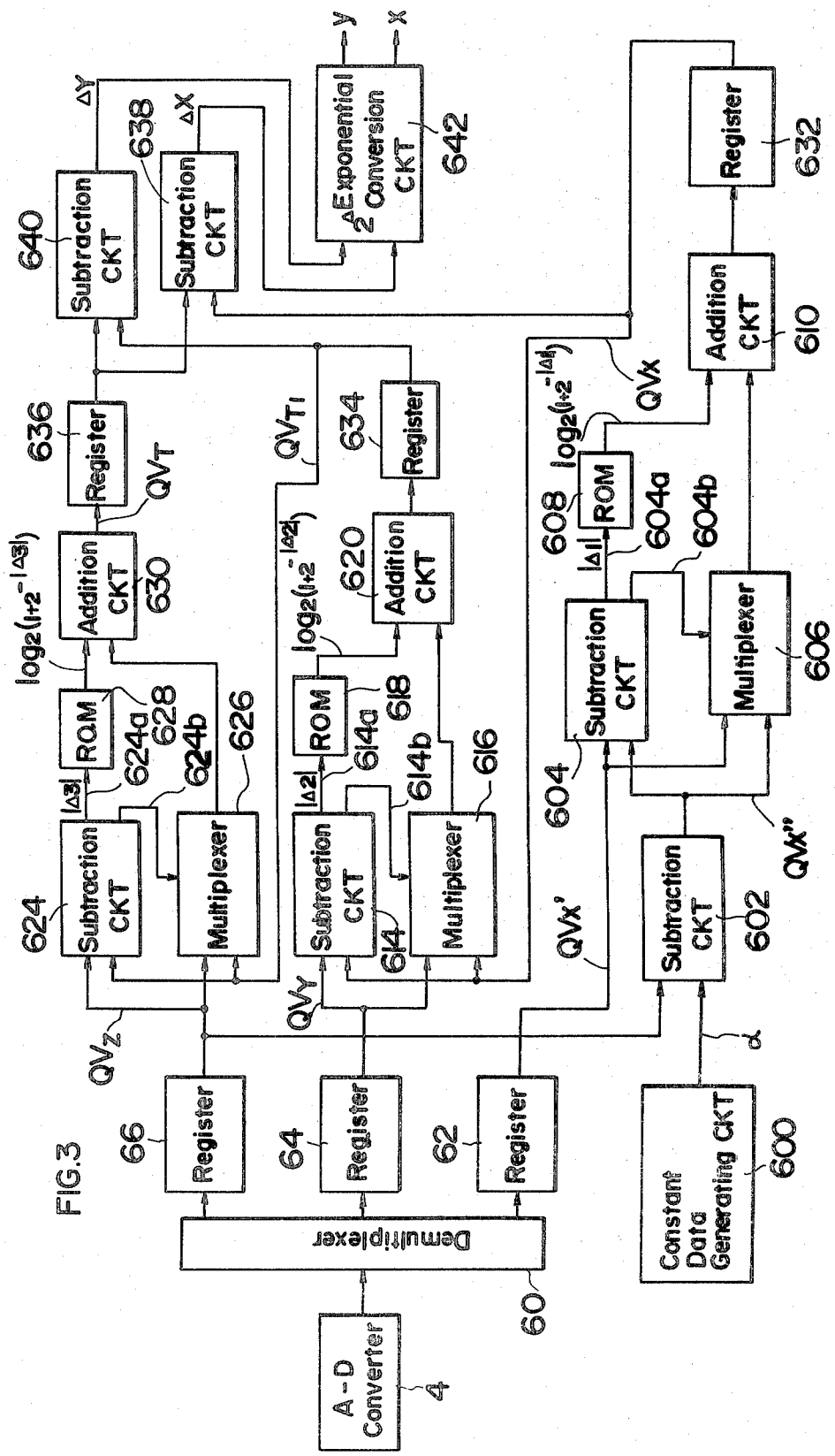

ory
COLORIMETER

BACKGROUND OF THE INVENTION

1. Field of the Invention

The present invention relates to a trichromatic colorimeter by which chromaticity coordinates (x and y) of the CIE standard are obtained.

2. Description of the Prior Art

The prior art trichromatic colorimeter obtains the CIE chromaticity coordinates (x and y) using 3 or 4 sets of filters and photosensitive elements, which obtain X, Y and Z represented by equation (1) below:

$$X = \frac{\int P_\lambda \cdot \rho_\lambda \cdot \bar{x}_\lambda \cdot d\lambda}{\int P_\lambda \cdot \bar{y}_\lambda \cdot d\lambda}$$

$$Y = \frac{\int P_\lambda \cdot \rho_\lambda \cdot \bar{y}_\lambda \cdot d\lambda}{\int P_\lambda \cdot \bar{y}_\lambda \cdot d\lambda}$$

$$Z = \frac{\int P_\lambda \cdot \rho_\lambda \cdot \bar{z}_\lambda \cdot d\lambda}{\int P_\lambda \cdot \bar{y}_\lambda \cdot d\lambda}$$

(1)

The X, Y and Z are obtained using a linear light measuring circuit, and are then applied as inputs to an operation circuit. The x and y are finally obtained by the operation of equation (2) below:

$$x = \frac{X}{X+Y+Z}, \quad y = \frac{Y}{X+Y+Z}$$

(2)

It should be noted that $P_\lambda$ represents a relative spectral distribution of a light source, $\rho_\lambda$, the spectral reflectance for an object to be measured, and $\bar{x}_\lambda$, $\bar{y}_\lambda$ and $\bar{z}_\lambda$, the spectral tristimulus values of the CIE standard colorimetric observer in equations (1) and (2) above. The $\bar{x}_\lambda$, $\bar{y}_\lambda$ and $\bar{z}_\lambda$ have their own characteristics as shown in FIG. 1. It is also noted that $\rho_\lambda$ is equal to 1 ($\rho_\lambda = 1$) when a light source color is an object to be measured.

When a linear light measuring circuit is used for the above light measuring device, a high power voltage is required to widen a measuring range. Also, this poses a problem of low measuring accuracy.

SUMMARY OF THE INVENTION

The primary object of the present invention is to provide a photoelectric colorimeter which obviates the above problems using a logarithmic compression type light measuring circuit, by which a measuring range is widened for the same power voltage as supplied by a linear light measuring, and high accuracy display of chromaticity coordinates is possible.

BRIEF DESCRIPTION OF THE DRAWINGS

FIG. 3 is a block diagram schematically illustrating an embodiment of the computation circuit of FIG. 2.

DETAILED DESCRIPTION OF THE PREFERRED EMBODIMENT

Description will now be given of the preferred embodiment of the present invention in conjunction with the accompanying drawings.

Figure 1:
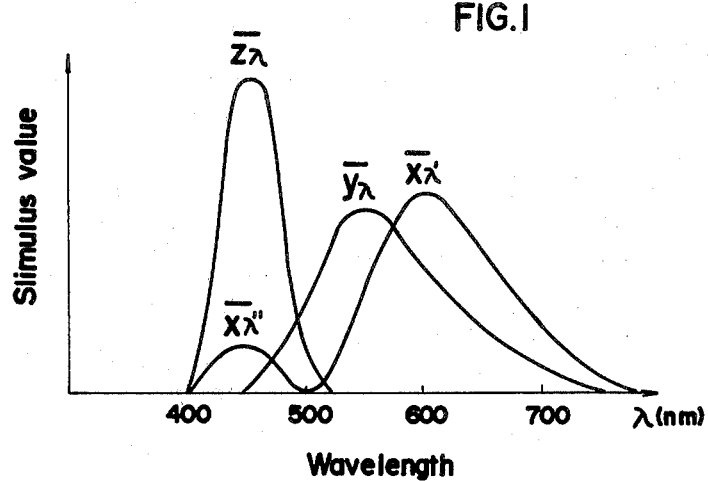
FIG. 1 shows a graph of spectral tristimulus values.
Figure 2:
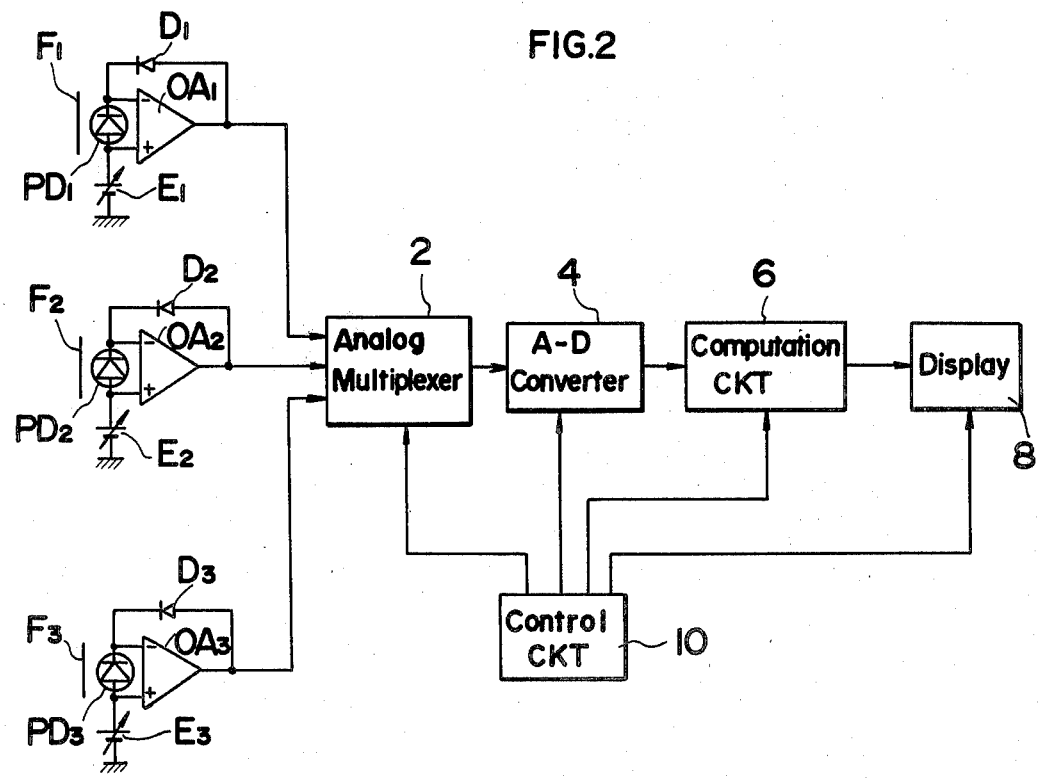
FIG. 2 is a schematic block diagram of an embodiment of the present invention.

FIG. 2 is a schematic block diagram of the embodiment of the present invention. Filters are labeled F1 through F3, photosensitive elements, (silicon photodiodes), are labeled PD1 through PD3. A combination of F1 and PD1 produces a spectral sensitivity of spectral stimulus value $\bar{x}_\lambda'$ (FIG. 1), a combination of F2 and PD2 produces a spectral sensitivity of spectral stimulus value $\bar{y}_\lambda$, and a combination of F3 and PD3 produces a spectral sensitivity of spectral stimulus value $\bar{z}_\lambda$ or $\bar{x}_\lambda''$. Diodes D1 through D3 convert the output currents of photosensitive elements PD1 through PD3 into the respective logarithmically compressed voltages. Operation amplifiers OA1 through OA3 are connected to diodes D1 through D3. Variable voltage sources E1 through E3 are used for adjustment. Consequently, the voltage available from operation amplifier OA1 corresponds to the logarithmic compression value of a light quantity (stimulus value X') for spectral stimulus value $\bar{x}\lambda'$.

$$QV_{x'} = k_{x'} \cdot \log_2 X' \quad (3)$$

The voltages available from operation amplifiers OA2 and OA3 correspond to the logarithmic compression values of light quantities (stimulus values Y,Z,X'') for spectral stimulus values $\bar{y}_\lambda$ and $\bar{z}_\lambda \bar{x}_\lambda''$, respectively.

$$QV_y = k_y \cdot \log_2 y \quad (4)$$

$$QV_z = k_z \cdot \log_2 Z = \alpha + k_{x''} \cdot \log_2 X'' \quad (5)$$

$(k_{x'} = k_{x''} = k_y = k_z = 1)$ ($\alpha$ is a constant)

The voltages are supplied through an analog multiplexer 2 to A-D converter 4 in a time series sequence for conversion into digital signals, which are entered in a register inside computation circuit 6. Based on the three data, words $QV_{x'}$, $QV_y$ and $QV_z$ entered in the register, predetermined calculations are carried out by the computation circuit 6 thereafter to obtain chromaticity coordinates (x and y) which are digitally displayed by display circuit 8. It should be understood that control circuit 10 controls multiplexer 2, A-D converter 4, computation circuit 6 and display circuit 8. Description is now given of the actual calculations out by computation circuit 6. First, QV is obtained from logarithmic compression values $QV_{x'}$ and $QV_z$ of light quantities (stimulus values) for spectral stimulus values $\bar{x}_\lambda$ and $\bar{z}_\lambda$. It should be noted that light quantity (stimulus value) X is written as $X = 2^{QV_{x'}} + 2^{QV_{x''}} = 2^{QV_x}$.

First, $QV_z - \alpha = QV_{x''}$ is obtained. Then, $QV_{x'} - QV_{x''} = \Delta_1$ is obtained.

This results in $$X = 2^{QV_x} = 2^{QV_{x'}} + 2^{QV_{x''}}$$
$$= 2^{QV_{x'}} + 2^{QV_{x'} - \Delta_1}$$
$$= 2^{QV_{x'}}(1 + 2^{-\Delta_1})$$

or $2^{QV_x} = 2^{QV_{x''}}(1 + 2^{\Delta_1})$.

Therefore, the following equation is formed:

$$QV_x = QV_{x'} + \log_2(1 + 2^{-\Delta_1})(\Delta_1 \geq 0)$$

or $$QV_x = QV_{x''} + \log_2(1 + 2^{\Delta_1})(\Delta_1 < 0)$$

Therefore, $QV_x$ is obtained by adding the value from $\log_2(1 + 2^{-\Delta_1})$ to $QV_{x'}$ when $\Delta_1$ is greater than 0 or by adding $\log_2(1 + 2^{\Delta_1})$ to $QV_{x''}$ when $\Delta_1$ is negative.

To obtain $\log_2(1+2^{-\Delta 1})$ or $\log_2(1+2^{\Delta 1})$, $\log_2(1+2^{-|\Delta 1|})$ corresponding to $|\Delta 1|$, for example, may be prestored in a ROM (read only memory), and a ROM address is designated by the data corresponding to the absolute value $|\Delta 1|$ of $\Delta 1$ so that the data corresponding to $\log_2(1+2^{-|\Delta 1|})$ stored therein is generated as an output. Furthermore, $\log_2(1+2^{-|\Delta 1|})$ is obtained here to minimize the area of the ROM where the data $\log_2(1+2^{-|\Delta 1|})$ corresponding to $|\Delta 1|$ is stored since $\log_2(1+2^{-|\Delta 1|})$ is converged into 0 as $|\Delta 1|$ becomes greater. Consequently, $\log_2(1+2^{-\Delta 1})$ or $\log_2(1+2^{\Delta 1})$ may be obtained regardless of $\Delta 1$ being positive or negative, without discriminating the positive or negative sign of $\Delta 1$. In this case, however, a ROM area for storage becomes very large. In addition, $QV_x$ can be obtained in a similar procedure by obtaining $QV_x'' - QV_x' = \Delta_1'$. Also, when the ROM area has no room for prestoring the data $\log_2(1+2^{-\Delta 1})$, for $\Delta 1$ value to an area belong to is identified by identifying the higher to lower bits of $\Delta 1$ in sequence, whereby $\log_2(1+2^{-|\Delta 1|})$ corresponding to the identified region may be obtained.

Thus, a light quantity (stimulus value x) in logarithmic form is obtained. In a similar procedure, the following is obtained.

$$QV_{T1} = QV_x + \log_2(1+2^{-\Delta 2})$$

or $$QV_{T1} = QV_x + \log_2(1+2^{\Delta 2})$$

from $QV_x - QV_y = \Delta 2$. This is subject to
$T1 = 2^{QV_{T1}} = 2^{QV_x} + 2^{QV_y}$.

Next, the following is obtained from $QV_{T1} - QV_z = \Delta 3$.

$$QV_T = QV_{T1} + \log_2(1+2^{-\Delta 3})$$

or $$QV_T = QV_z + \log_2(1+2^{\Delta 3})$$

(wherein $T = 2^{QV_T} = 2^{QV_{T1}} + 2^{QV_z}$)

From $QV_T$, $QV_x$ and $QV_y$ obtained as above, the following are obtained:

$$QV_x - QV_T = \Delta x$$

$$QV_y - QV_T = \Delta y$$

From $\Delta x$ and $\Delta y$, chromaticity coordinates are obtained as follows to calculate x and y. $x = 2^{\Delta x}$, $y = 2^{\Delta y}$ Calculations of $2^{\Delta x}$ and $2^{\Delta y}$ may be done using a known method as that used in electronic calculators.

For example, p, q, and r defined by the following formula are to be firstly obtained from $\Delta$:

$$\Delta = 4p - q - r$$

wherein p is an integer; $q = 0$ or 1 or 3; and $1 > r \geq 0$. And $2^{-r}$ is to be obtained by the following formula from r:

$$2^{-r} = 1 - \frac{2r}{0.035 \cdot r^2 + r + 9.955 - \frac{617.972}{r^2 + 87.418}}$$

Finally $2^{-r}$ is to by multiplied by $2^{-q}$ and $2^{4p}$ to obtain $2^{\Delta}$. Thus, x and y are obtainable by applying the above method.

FIG. 3 is a schematic block diagram of an embodiment of the computation circuit of FIG. 2. Description will be given of the operation and block diagram thereof. Data on logarithmic compression values of light quantities (stimulus values X', Y and Z) form A-D converter 4 are respectively set in registers 62 through 66 through multiplexer 60 in a time sequence. For example, data corresponding to $QV_x$, is first set in register 62, data corresponding to QVy in register 64 and data corresponding to QVz then in register 66. After setting data in registers 62 through 66, data from constant data output circuit 600 is subtracted from data QVz from register 66 in subtraction circuit 602 to calculate QVx''. Data QVx'' and data QVx'' from register 62 are both supplied as inputs to subtraction circuit 604 and multiplexer 606.

Output terminal 604a of subtraction circuit 604 generates data corresponding to $|\Delta 1| = |QVx' - QVx''|$, and terminal 604b generates a "high" level signal when $QVx' \geq QVx''$ and a "low" level signal when $QVx' < QVx''$.

Multiplexer 606 generates data corresponding to logarithmic compression value QVx' of a light quantity (stimulus value X') for spectral stimulus value $\bar{x}_\lambda$, when terminal 604b is at "high" level, while it generates data corresponding to logarithmic compression value QVx'' of a light quantity (stimulus value X'') for spectral stimulus value $\bar{x}'\lambda$ when terminal 604b is at "low" level. Furthermore, an ROM address is designated by data $|\Delta 1|$ from terminal 604a, and data corresponding to $\log_2(1+2^{-|\Delta 1|})$ stored therein is generated as an output. Data QVx' or QVx'' from multiplexer 606 and $\log_2(1+2^{-|\Delta 1|})$ from ROM 608 are supplied as inputs to addition circuit 610, where the logarithmic compression value of a light quantity for spectral stimulus value $\bar{x}\lambda$, $QVx = QVx' + \log_2(1+2^{-\Delta 1})$ or $QVx = QVx'' + \log_2(1+2^{\Delta 1})$ is calculated depending on the positive or negative sign of $\Delta 1$, data corresponding to QVx is computed and stored in register 632.

Data corresponding to QVx from register 632 and data from register 64 are supplied as inputs to subtraction circuit 614 and multiplexer 616, and calculations of $QVx - QVy = \Delta 2$ are performed by subtraction circuit 614, whereby data corresponding to $1\Delta 21$ is generated from terminal 614a and a "high" level signal when $\Delta 2$ is greater than 0 and a "low" level signal when $\Delta 2$ is negative are generated from terminal 614b. In response to the above signals, multiplexer 616 generates data corresponding to QVx when the signal is at "high" level, and data corresponding to QVy when the signal is at "low" level. The data is added to data corresponding to $\log_2(1+2^{-|\Delta 2|})$ from ROM 618 by addition circuit 620 to calculate the following:

$$QV_{T1} = QVx + \log_2(1+2^{-\Delta 2})$$

or $$QV_{T1} = QVy + \log_2(1+2^{\Delta 2}).$$

This data is stored in register 634.

Data corresponding to $QV_{T1}$ from register 634 and data corresponding to QVz from register 66 are supplied as inputs to subtraction circuit 624 and multiplexer 626, and calculations of $QV_{T1} - QVz = \Delta 3$ are performed by subtraction circuit 624, and data corresponding to 1Δ21 is generated from terminal 624a, and a "high" level signal when Δ3 is greater then 0 and a "low" level signal when Δ3 is negative are generated from terminal 624b.

In response to the signal from terminal 624b, multiplexer 626 generates $QV_{T1}$ when the signal is at "high" level and $QV_z$ when the signal is at "low" level. Data corresponding to $QV_{T1}$ or $QV_z$ from multiplexer 626 and data corresponding to $\log_2(1+2^{-|\Delta 3|})$ from ROM 628 are supplied as inputs to addition circuit 630 where calculation of $QV_T = QV_{T1} + \log_2(1+2^{-\Delta 3})$ or $QV_T = QVz + \log_2(1+2^{\Delta 3})$ are performed, and data corresponding to $QV_T$ is supplied as an input to register 636.

Next, data from registers 636 and 632 are supplied as inputs to subtraction circuit 638, where calculations of $\Delta_x = QV_x - QV_T$ are carried out. As a result, the exponential part of 2 in $X/(X+Y+Z) = 2^{\Delta x}$ has been calculated, and $2^{\Delta x} = x$ is calculated by exponential conversion circuit 642, and the data is digitally displayed by diaplay circuit 8.

In addition, data from registers 636 and 634 are supplied as inputs to subtraction circuit 640 where $\Delta_y = QV_y - QV_T$ is calculated, and $2^{\Delta y} = y$ is further calculated by exponential conversion circuit 642, and the data is displayed by display circuit 8.

With the above embodiment, the subtraction circuit, ROM, register and multiplexer are described one by one to facilitate understanding. Since these are used in common, and the exponential operation circuit is feasible using known circuitry, their description is omitted. It should be understood that the above circuitry may be effected by using random logic circuitry consisting of circuits in response to individual operations by using a microcomputer actuated by a central processing unit (CPU) based on a program stored in memory ROM.

Furthermore, the above embodiment uses 3 photosensitive elements (silicon diodes). However, the present invention is applicable to a type consisting of a total of 4 photosensitive elements including 2 elements corresponding to spectral stimulus values $\bar{x}_\lambda'$ and $\bar{x}_\lambda''$ for color measurement. In addition, the present invention is applicable to another type using one photosensitive element and the filter in front thereof changeable in a time series sequence.

With the present invention, the output current from the photosensitive elements is logarithmically compressed and stored and chromaticity coordinates x and y are processed for operation based on the logarithmic compression value. This causes the maximum amplitude of the signal handled by each circuit to become small, thereby widening a measuring range and ensuring high accuracy CIE chromaticity coordinates.

What is claimed is:

1. A colorimeter for obtaining the CIE chromaticity coordinates of an object to be measured comprising:
   means for obtaining a plurality of light measuring signals with a plurality of different spectral sensitivities, each of said signals being respectively corresponding to the logarithm of each intensity of light sensed with each of the different spectral sensitivities;
   computing means, connected to said obtaining means, for computing the CIE chromaticity coordinates from said light measuring signals, said computing means including a first means for calculating a value corresponding to the logarithm of a sum of a plurality of the intensities of light sensed with the different spectral sensitivities, second means responsive to said obtaining means and said first calculating means, for calculating the logarithms of chromaticity coordinates, respectively, and third means, responsive to said second calculating means, for calculating the chromaticity coordinates; and
   means, connected to said computing means, for displaying the CIE chromaticity coordinates.

2. A colorimeter as claimed in claim 1, wherein said obtaining means includes means for generating at least three light measuring signals, each corresponding to the logarithm of one of at least three different stimulus values; and wherein said value calculated by said first calculating means corresponds to the logarithm of a sum of said at least three stimulus values; and wherein said second calculating means includes means for subtracting said calculated value from one of said light measuring signals.

3. A colorimeter as claimed in claim 2, wherein said at least three light measuring signals correspond to log X', log Y and at least one of log Z and log X", respectively, wherein X', X", Y and Z are stimulus values and X, Y, and Z correspond to said at least three stimulus values, respectively, and wherein $X' + X'' = X$ and wherein said value calculated by said first calculating means corresponds to log (X+Y+Z); and wherein said subtracting means performs the following subtraction:

$$\log Y - \log(X+Y+Z) = \log \frac{Y}{X+Y+Z} = \log y,$$

provided that y corresponds to one of said chromaticity coordinates; and wherein said third calculating means includes means for practicing an antilogarithmic calculation to obtain y from log y.

4. A colorimeter as claimed in claim 3, wherein said first calculating means includes supplementary means for calculating a value corresponding to log X in response to the light measuring signals corresponding to log X' and one of log Z and log X"; and wherein said second calculating means further includes means for subtracting said value calculated by said first calculating means from said value calculated by said supplementary calculating means in accordance with the equality:

$$\log X - \log(X+Y+Z) = \log \frac{X}{X+Y+Z} = \log x,$$

provided that x corresponds to another one of said chromaticity coordinates; and wherein said means for practicing the antilogarithmic calculation is further capable of obtaining x from log x.

5. A colorimeter as claimed in claim 4, wherein said computing means consists of a micro-computer.

6. A colorimeter as claimed in claim 5, wherein said obtaining means includes a plurality of light measuring circuits and a plurality of different wavelength selective filters combined with said light measuring circuits, respectively.

7. A colorimeter as claimed in claim 6, wherein each of said light measuring circuits includes a logarithmic conversion circuit.

8. A colorimeter as claimed in claim 1, wherein said first calculating means includes means for subtracting a signal corresponding to the logarithm of a light intensity from another signal corresponding to the logarithm of another light intensity, a means responsive to said subtracting means for providing an output having a predetermined relationship to the result of the subtraction by said subtracting means, and a means for adding said output to one of said signal corresponding to a light intensity and said signal corresponding to another light intensity, whereby said adding means provides a value corresponding to the logarithm of the sum of said two light intensities.

9. A colorimeter for obtaining the CIE chromaticity coordinates of an object to be measured comprising:

means for obtaining a plurality of light measuring signals with a plurality of different spectral sensitivities, each of said signals being respectively corresponding to the logarithm of each intensity of light sensed with each of the different spectral sensitivities;

computing means, connected to said obtaining means, for computing the CIE chromaticity coordinates from said light measuring signals, said computing means including a first means responsive to said obtaining means for calculating three values corresponding to log X, log Y and log Z, respectively, provided that X, Y and Z are tristimulus values, a second means for calculating a value corresponding to log (X+Y+Z) in response to said first calculating means, a third means responsive to said and second calculating means for calculating $$\log \{X/(X+Y+Z)\}$$

and $$\log \{Y/(X+Y+Z)\}$$

, which are equal to log x and log y, respectively, provided that x and y correspond to said CIE chromaticity coordinates, and fourth means for calculating x and y, repsectively, in response to said third calculating means; and means, connected to said computing means, for displaying said CIE chromaticity coordinates.

10. A colorimeter as claimed in claim 9, wherein said computing means consists of a micro-computer.

11. A colorimeter as claimed in claim 9, wherein said obtaining means includes means for generating at least three light measuring signals, which correspond to log X', log Y and at least one of log Z and log X'', respectively, provided that X' and X'' are stimulus values and X'+X''=X, and wherein said first calculating means includes supplementary means responsive to said generating means for calculating a value correspond to log (X'+X''), wherein log (X'+X'')=log X.

12. A colorimeter as claimed in claim 9, wherein said first and second calculating means are substantially identical to each other, and each include: means for subtracting $\log_a B$ from $\log_a A$ to provide a resultant output C provided that $\log_a A$ and $\log_a B$ are input signals of said subtracting means given in a logarithmic value with respect to base a and C is said output signal, means for providing a signal D which is related to C by the equality:

$$D = \log_a(1 + a^C);$$

and means for adding D to $\log_a B$ to obtain a value which is equal to $\log_a(A+B)$.

13. A colorimeter as claimed in claim 12, wherein said computing means further includes means for repeating the operation of said subtracting means, introducing means and adding means to obtain a value corresponding to the logarithm of the sum of more than two signals input to said subtracting means from the respective logarithms of said individual signals input to said subtracting means.

* * * * *